ANTI-STATIC POLYSTYRENE-POLYBUTADIENE BLENDS

Gerlinde Bürklin, Erlangen, Germany, assignor to Siemens Aktiengesellschaft, a corporation of Germany
No Drawing. Filed Feb. 3, 1964, Ser. No. 342,271
8 Claims. (Cl. 260—892)

My invention relates to antistatic impact-resistant polystyrene compositions.

The use of impact-resistant polystyrene as a structural material in devices, such as household appliances, often encounters the trouble that this material tends to become electrostatically charged by friction, and that such a charge, on account of the high electric surface resistance, persists for prolonged periods of time and results in excessive soiling of the surface. It has been attempted to remedy this by coating the polystyrene surface with thin layers of great water retention. Such coatings are too easily removed by rubbing or washing so that the antistatic effect is soon lost.

If one attempts to work antistatically-active substances directly and homogeneously into normal polystyrene, it is found that such substances in most cases are incompatible with the base material.

It is an object of my invention to avoid these difficulties.

According to my invention, an impact-resistant polystyrene base material having a polybutadiene component is given an admixture of chemical compounds that contain oxyalkyl- and/or hydroxy- and/or amino- and/or imino-groups attachable to the polybutadiene component of the impact-resistant polystyrene base. Such additives diffuse slowly to the surface of the polystyrene body. The vapor pressure and therefore volatility of the admixtures is sufficiently low to prevent a noticeable loss of the admixture during prolonged storage, e.g. at least a year, or normal fabrication of the polystyrene body. The polystyrene base, to which the just-mentioned admixture is added, consists of known impact-resistant material, namely polystyrene modified with polybutadiene or with butadiene-acrylonitrile copolymer, and preferably contains 10 to 30% polybutadiene. This impact-resistant polystyrene base constitutes the predominant portion, namely more than 90% of the entire composition. The additive constitutes at least about 2% and is preferably 4 to 8% of the total weight of the composition.

The additions, made according to the invention, result in a surface conductivity on account of the water retentiveness of the admixtures. The mechanical properties of the polystyrene base are not impaired.

Chemical compounds having the following constitution are particularly well suited as additions to impact-resistant polystyrene.

(1) $R[(CH_2OCH_2)_xOH]_3$; $R=N\underset{(CH_2)_y}{\overset{(CH_2)_y}{-}}(CH_2)_y$  $y \geq 2$; $x \geq 3$ (2) $(-CH_2-CH_2-NH-)_x$; $x \geq 200$ (3) $ROOCH_2[CH_2OCH_2]_xCH_2OOR$; R=hydrocarbon radical with 6 to 18 C-atoms; $x \geq 2$ (4) 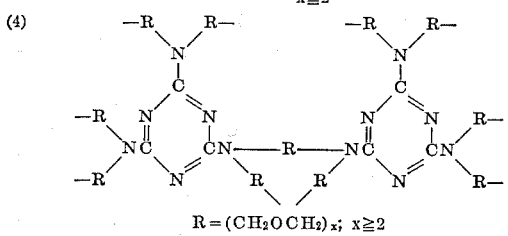

$R=(CH_2OCH_2)_x$; $x \geq 2$

The invention will be further described with reference to the following examples wherein the additives are percent by total weight of the composition.

EXAMPLE 1

Impact-resistant polystyrene with a polybutadiene content of about 15% was plastified in a kneader at a temperature of 150° C. 4%, by weight of the total composition, of a condensation product from triethanolamine-ethyleneoxide having the constitution:

$$N[CH_2CH_2O(CH_2OCH_2)_8OH]_3$$

were worked into the material within 20 minutes. Thereafter the homogeneous mass was permitted to cool and then converted in conventional manner to granular form for use in an extrusion press.

EXAMPLE 2

The process was carried out by employing a condensation product made neutral by means of benzoic acid, in lieu of the alkaline condensation product of triethanolamine-ethyleneoxide used in Example 1. 4%, by weight of the total composition, of this additive were worked into the impact-resistant polystyrene material within a period of about 20 minutes. After cooling, the homogeneous mass was converted into granules and shaped in an extrusion press.

EXAMPLE 3

Impact-resistant polystyrene having a polybutadiene content of about 15% was plastified in a kneader at a temperature of 150° C. Within 20 minutes, an amount of 8% of a condensation product of triethanolamine-ethyleneoxide neutralized with benzoic acid was added. The additive had the composition:

$$N[CH_2CH_2O(CH_2OCH_2)_8OH]_3$$

After the homogeneous mass was cooled, it was converted in the conventional manner to granules and further fabricated, for example by means of extrusion.

EXAMPLE 4

Impact-resistant polystyrene having a polybutadiene content of about 15% was plastified in a kneader at 150° C. Within 20 minutes, 4% of the condensation product of 2 to 10% by weight of triethanolamine-ethyleneoxide, neutralized by itaconic acid and having the constitution:

$$N[CH_2CH_2O(CH_2OCH_2)_8OH]_3$$

were added. After cooling, the homogeneous mass was converted in conventional manner to granules and shaped by means of extrusion.

EXAMPLE 5

The process was carried out as in Example 4, except that pyromellitic acid was employed for neutralization.

EXAMPLE 6

In this example and Examples 7 to 10, impact-resistant polystyrene containing 15% polybutadiene was used. (See the table at the end of the specification.) 4% polyglycolester of the constitution $$H_{17}C_8OOCH_2[CH_2OCH_2]_2CH_2OOC_8H_{17}$$

was mixed with impact-resistant polystyrene, employed in granular form, without the use of a kneader, at room temperature, until the impact-resistant polystyrene was coated with a uniform layer of the added substance (about 10 hours) and thereafter directly used in an extrusion press.

EXAMPLE 7

Impact-resistant polystyrene was mixed cold (room temperature) with 6% polyglycolester of the constitution

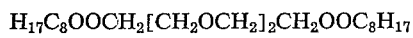

after about 10 hours the product was directly transferred to an extrusion press.

EXAMPLE 8

Impact-resistant polystyrene was mixed without a kneader, at room temperature, with 4% polyethylenimine of the constitution $$(-CH_2-CH_2-NH-)_x$$

having a median molecular weight of 1,200, and was thereafter converted to granular form by means of an extruder. The granules were then suitable for fabrication in conventional manner.

EXAMPLE 9

Impact-resistant polystyrene was worked in a kneader at 150° C. for about one-half hour, together with 4% of a condensation product, from melamineformaldehyde and a diol having a molecular weight of 400, and of the formula:

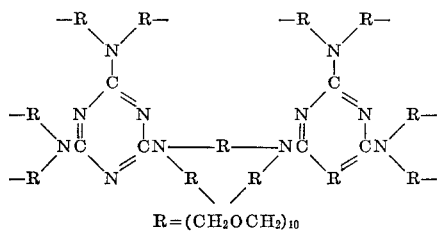

$$R=(CH_2OCH_2)_{10}$$

After the product was homogenized, it was comminuted and fabricated by means of an extrusion press.

EXAMPLE 10

Impact-resistant polystyrene was worked in a kneader at 150° C. for about one-half hour together with 6% of a condensation product, from melamineformaldehyde and a diol, of the formula:

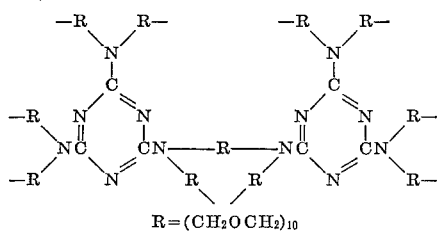

$$R=(CH_2OCH_2)_{10}$$

After the product was homogenized, it was comminuted and used in an extrusion press.

EXAMPLE 11

Impact-resistant polystyrene was mixed with 8% of a 1:1 mixture composed of polyglycolester of a high-molecular fatty acid of the formula $$H_{17}C_8OOCH_2[CH_2OCH_2]_2CH_2OOC_8H_{17}$$

and a melamineformaldehyde-diol condensation product having the formula

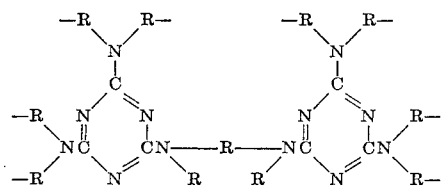

wherein $R=(CH_2OCH_2)_{10}$. The mixture was worked at room temperature in a mixer until it was homogenized (about 20 minutes). Therafter the mixture was fabricated in an extrusion press in the conventional manner.

The production of the condensation product from melamine, formaldehyde and a polyalcohol was effected in known manner. 250 g. melamine were condensed with 1,000 g. of formaldehyde in 30% concentration and with an addition of 1,600 g. of a diol having a molecular weight of 400. Alkaline condensation was effected by stirring the mixture at 80° C. until a clear, homogeneous solution is obtained. The water was then removed by vacuum. The resulting condensation product has a refraction index of 1.49 at 20° C.

The following table indicates the electric insulation resistances measured with specimen bodies produced according to Examples 1 to 10 in comparison with a specimen without admixture according to the invention. The resistances were measured in accordance with the German standards (DIN 53482).

TABLE

| Specimen | Insulation resistance (in ohm) between probes at 65% rel. air humidity, temperature 23° C. |
|---|---|
| Impact-resistant polystyrene with 15% polybutadiene (no addition) | $10^{13}$ |
| Example: | |
| 1 | $7.7 \times 10^{10}$ |
| 2 | $4 \times 10^9$ |
| 3 | $6 \times 10^7$ |
| 4 | $1.4 \times 10^{11}$ |
| 5 | $7 \times 10^{10}$ |
| 6 | $4 \times 10^{11}$ |
| 7 | $4 \times 10^{10}$ |
| 8 | $4 \times 10^{10}$ |
| 9 | $3 \times 10^{10}$ |
| 10 | $1 \times 10^{10}$ |

I claim:

1. An antistatic polystyrene composition consisting of an impact-resistant polystyrene base having a polybutadiene component of up to 30% by weight, and an admixture of 2 to 10% by weight of the formula $$R[(CH_2OCH_2)_xOH]_3$$

wherein $x \geq 3$,

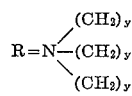

and $y \geq 2$.

2. An antistatic polystyrene composition consisting of an impact-resistant polystyrene base having a polybutadiene component of up to 30% by weight, and an admixture of 2 to 10% by weight of the formula $$(-CH_2-CH_2NH-)_x$$

where $x \geq 200$.

3. An antistatic polystyrene composition consisting of an impact-resistant polystyrene base having a polybutadiene component of up to 30% by weight, and an admixture of 2 to 10% by weight of the formula

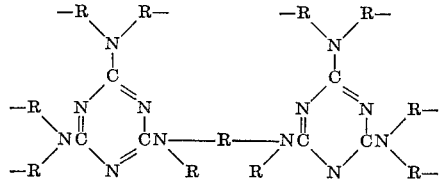

wherein $R=(CH_2OCH_2)_x$ and $x \geq 2$.

4. An antistatic polystyrene composition consisting of an impact-resistant polystyrene base having a polybutadiene component of up to 30% by weight, and up to 5% by weight of an admixture of the formula $$ROOCH_2[CH_2OCH_2]_xCH_2OOR$$

wherein $x \geq 2$ and R is a hydrocarbon radical with 6 to

18 C-atoms, and up to 9% by weight of a compound of the formula

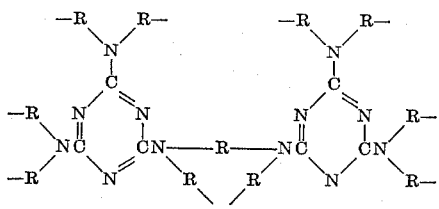

wherein $R=(CH_2OCH_2)_x$ and $x \geq 2$.

5. An antistatic impact-resistant polystyrene composition formed of polystyrene modified with approximately 15% polybutadiene, and an admixture of about 3 to about 9% by weight of the composition of a condensation product of triethanolamine of the formula

6. An antistatic impact-resistant polystyrene composition formed of polystyrene modified with approximately 15% of polybutadiene, and an admixture of about 3 to about 9% by weight of the composition of a polyethylenimine of the formula $$(-CH_2-CH_2-NH-)_x$$

and a median molecular weight of 1200.

7. An antistatic impact-resistant polystyrene composition formed of polystyrene modified with approximately 15% polybutadiene, and an admixture of about 3 to about 9% by weight of the composition of a condensation product of melamine, formaldehyde and a diol and having the constitution

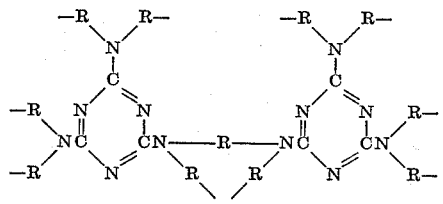

wherein $R=(CH_2OCH_2)_{10}$.

8. An antistatic impact-resistant polystyrene composition formed of polystyrene modified with approximately 15% of polybutadiene, and an admixture of about 6 to about 10% by weight of the composition, said admixture being a mixture of substantially equal parts by weight of two compounds, one of said compounds being a polyglycolester of high-molecular weight fatty acid of the formula

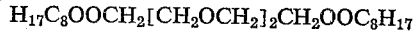

the other compound being a condensation product of melamine-formaldehyde-diol of the formula

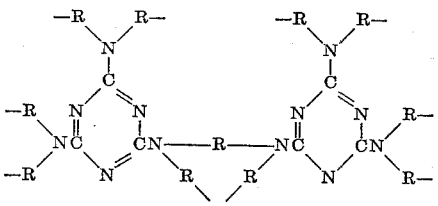

wherein $R=(CH_2OCH_2)_{10}$.

References Cited

UNITED STATES PATENTS

| | | | |
|---|---|---|---|
| 3,297,652 | 1/1967 | Tomiyama et al. | 260—75 |
| 3,321,456 | 5/1967 | Braus et al. | 260—94.9 |
| 3,332,912 | 7/1967 | Rochlitz et al. | 260—67 |
| 2,403,960 | 7/1946 | Stoops et al. | 117—139.5 |
| 2,664,410 | 12/1953 | Darby et al. | 260—31.8 |
| 2,727,878 | 12/1955 | Ballman et al. | 260—892 |
| 2,810,707 | 10/1957 | Nagle | 260—892 |
| 2,891,027 | 6/1959 | Coler et al. | 260—32.6 |
| 2,931,783 | 4/1960 | Coler et al. | 260—32.6 |
| 2,958,671 | 11/1960 | Keskkula et al. | 260—892 |
| 3,013,997 | 12/1961 | Coler et al. | 260—32.6 |
| 3,025,257 | 3/1962 | Coler et al. | 260—32.6 |
| 3,040,076 | 6/1962 | Seidel et al. | 260—584 |
| 3,090,767 | 5/1963 | Colgan et al. | 260—892 |
| 3,177,174 | 4/1965 | Tirpak | 260—31.4 |
| 3,231,619 | 1/1966 | Speranza | 260—584 |

DONALD E. CZAJA, *Primary Examiner.*

R. A. WHITE, *Assistant Examiner.*

U.S. Cl. X.R.

260—93.5, 94.7

UNITED STATES PATENT OFFICE
CERTIFICATE OF CORRECTION

Patent No. 3,419,640                                        December 31, 1968

Gerlinde Bürklin

It is certified that error appears in the above identified patent and that said Letters Patent are hereby corrected as shown below:

In the heading to the printed specification, between lines 6 and 7, insert -- Claims priority, application, Germany Feb. 2, 1963, S 83567 --.

Signed and sealed this 24th day of March 1970.

(SEAL)
Attest:

Edward M. Fletcher, Jr.

Attesting Officer

WILLIAM E. SCHUYLER, JR.

Commissioner of Patents